US011219105B1

(12) United States Patent
Hernandez Lopez et al.

(10) Patent No.: US 11,219,105 B1
(45) Date of Patent: Jan. 4, 2022

(54) CURRENT BALANCING CIRCUIT FOR LIGHT EMITTING DIODE STRINGS

(71) Applicant: VARROC LIGHTING SYSTEMS, s.r.o., Šenov u Nového Jičína (CZ)

(72) Inventors: Arturo Hernandez Lopez, Apodaca Nuevo León (MX); Cutberto Medina, Novi, MI (US)

(73) Assignee: VARROC LIGHTING SYSTEMS, S.R.O., Senov u Nového Jicína (CZ)

( * ) Notice: Subject to any disclaimer, the term of this patent is extended or adjusted under 35 U.S.C. 154(b) by 0 days.

(21) Appl. No.: 17/124,573

(22) Filed: Dec. 17, 2020

(51) Int. Cl.
*H05B 45/34* (2020.01)
*H05B 45/345* (2020.01)
*H05B 45/46* (2020.01)
*H05B 45/48* (2020.01)
*B60Q 1/14* (2006.01)

(52) U.S. Cl.
CPC .......... *H05B 45/345* (2020.01); *H05B 45/46* (2020.01); *H05B 45/48* (2020.01); *B60Q 1/1407* (2013.01)

(58) Field of Classification Search
CPC ...... H05B 45/10; H05B 45/345; H05B 45/46; H05B 45/48; B60Q 1/1407
See application file for complete search history.

(56) References Cited

U.S. PATENT DOCUMENTS

| 6,621,235 | B2 | 9/2003 | Chang |
| 7,042,165 | B2 | 5/2006 | Madhani et al. |
| 8,253,342 | B2 | 8/2012 | Ku et al. |
| 8,829,884 | B2 | 9/2014 | Zhong et al. |
| 8,901,838 | B2 | 12/2014 | Akiyama et al. |
| 10,009,971 | B2 | 6/2018 | Chobot et al. |
| 2007/0222391 | A1 | 9/2007 | Lee et al. |
| 2009/0187925 | A1 | 7/2009 | Hu et al. |
| 2011/0254456 | A1 | 10/2011 | Ko |
| 2014/0001978 | A1 | 1/2014 | Lee |
| 2014/0159595 | A1* | 6/2014 | Sutardja ................. H05B 45/24 315/192 |
| 2014/0159600 | A1* | 6/2014 | Sutardja ................. H05B 45/24 315/193 |
| 2016/0381752 | A1 | 12/2016 | Louvel |

FOREIGN PATENT DOCUMENTS

| DE | 102204008896 A1 | 9/2004 |
| DE | 10324609 A1 | 12/2004 |
| DE | 102010048362 A1 | 4/2012 |
| DE | 102011087658 A1 | 6/2013 |

* cited by examiner

*Primary Examiner* — Jimmy T Vu
(74) *Attorney, Agent, or Firm* — Cantor Colburn LLP

(57) ABSTRACT

A circuit includes a primary light emitting diode (LED) string, a secondary LED string, a reference line, and primary and secondary transistors. The primary string includes a voltage drop, and a node disposed between two adjacent LEDs of the primary string. The secondary string is configured in parallel with the primary string. The secondary string has a voltage drop that is less than the primary voltage drop. The reference line is coupled to the node. The primary transistor includes a drain, a gate, and a source. The drain is coupled to a primary string output terminal. The gate is coupled to the reference line, and the source is coupled to a ground. The secondary transistor includes a drain, a gate, and a source. The drain is coupled to a secondary string output terminal. The gate is coupled to the reference line, and the source is coupled to the ground.

20 Claims, 2 Drawing Sheets

CURRENT BALANCING CIRCUIT FOR LIGHT EMITTING DIODE STRINGS

INTRODUCTION

The subject disclosure relates to a current balancing circuit, and more particularly to a current balancing circuit having a plurality of light emitting diode strings with different voltage drops.

In applications that utilize multiple light emitting diode (LED) strings oriented in parallel to one-another, variation of the parallel loads may cause most, or all, of the current to pass through the path of the load with the lowest voltage and a small amount of current through the path of the load with the highest voltage. The result would be a variation of light and may cause LED failure from excessive current.

An objective in the art is to achieve the same current passing through each parallel LED string even though the voltage across each load is not the same. Traditional current balancing circuits, or methods, applied to parallel LED strings are complex where precision current control requirements are needed. Moreover, known methods are susceptible to temperature changes.

Accordingly, it is desirable to provide a relatively simple, robust, and inexpensive circuit capable of balancing current through each one of a plurality of parallel LED strings.

SUMMARY

A current balancing circuit according to one, non-limiting, embodiment of the present disclosure includes a primary light emitting diode (LED) string having a primary voltage drop, a first node disposed between two adjacent LEDs of the primary LED string, an input terminal, and an output terminal; a secondary LED string configured in parallel with the primary LED string, the secondary LED string having a secondary voltage drop being less than the primary voltage drop, an input terminal, and an output terminal; a reference line coupled to the first node; a primary transistor including a primary drain, a primary gate, and a primary source, the primary drain being coupled to the output terminal of the primary LED string, the primary gate being coupled to the reference line, and the primary source being coupled to a ground; and a secondary transistor including a secondary drain, a secondary gate, and a secondary source, the secondary drain being coupled to the output terminal of the secondary LED string, the secondary gate being coupled to the reference line, and the secondary source being coupled to the ground.

In addition to the foregoing embodiment, the primary and secondary transistors are metal oxide semiconductor field effect transistors (MOSFETs).

In the alternative or additionally thereto, in the foregoing embodiment, the current balancing circuit includes a first resistor located in the reference line and between a second node of the reference line and the first node, wherein the second node is located between the first resistor and the primary gate, and the second node is located between the first resistor and the secondary gate.

In the alternative or additionally thereto, in the foregoing embodiment, the current balancing circuit includes a second resistor coupled directly between the second node and the primary gate; and a third resistor coupled directly between the second node and the secondary gate.

In the alternative or additionally thereto, in the foregoing embodiment, the second node is coupled to ground.

In the alternative or additionally thereto, in the foregoing embodiment, the current balancing circuit includes a fourth resistor coupled between the second node and the ground; a fifth resistor coupled between the primary source and the ground; and a sixth resistor coupled between the secondary source and the ground.

In the alternative or additionally thereto, in the foregoing embodiment, the fourth, fifth, and sixth resistors are ballasting resistors.

In the alternative or additionally thereto, in the foregoing embodiment, the primary and secondary transistors are metal oxide semiconductor field effect transistors (MOSFETs).

In the alternative or additionally thereto, in the foregoing embodiment, the primary LED string includes more LEDs than the secondary LED string.

In the alternative or additionally thereto, in the foregoing embodiment, the current balancing circuit includes a constant current power source coupled to the input terminals of the primary and secondary LED strings.

In the alternative or additionally thereto, in the foregoing embodiment, the current balancing circuit includes a constant voltage power source coupled to the input terminals of the primary and secondary LED strings.

In the alternative or additionally thereto, in the foregoing embodiment, the current balancing circuit includes a second secondary LED string configured in parallel with the primary and secondary LED strings, the second secondary LED string having a second secondary voltage drop that is less than the primary and secondary voltage drops; and a second secondary transistor including a second secondary drain, a second secondary gate, and a second secondary source, the second secondary drain being coupled to an output terminal of the second secondary LED string, the second secondary gate being coupled to the reference line, and the second secondary source being coupled to the ground.

In the alternative or additionally thereto, in the foregoing embodiment, the second node is located between the first resistor and the second secondary gate.

In the alternative or additionally thereto, in the foregoing embodiment, the MOSFETs are configured for MOSFET RDS ohmic linear resistance.

A vehicle light assembly according to another, non-limiting, embodiment of the present disclosure includes a primary light emitting diode (LED) string having a primary voltage drop, a first node disposed between two adjacent LEDs of the primary LED string, an input terminal, and an output terminal; a secondary LED string configured in parallel with the primary LED string, the secondary LED string having a secondary voltage drop being less than the primary voltage drop, an input terminal, and an output terminal; a reference line coupled to the first node; a primary transistor including a primary drain, a primary base, and a primary source, the primary drain being coupled to the output terminal of the primary LED string, the primary gate being coupled to the reference line, and the primary source being coupled to a ground; and a secondary transistor including a secondary drain, a secondary gate, and a secondary source, the secondary drain being coupled to the output terminal of the secondary LED string, the secondary gate being coupled to the reference line, and the secondary source being coupled to the ground.

In addition to the foregoing embodiment, the primary and secondary transistors are metal oxide semiconductor field effect transistors (MOSFETs).

In the alternative or additionally thereto, in the foregoing embodiment, the vehicle light assembly includes a first resistor located in the reference line and between a second node of the reference line and the first node, wherein the second node is located between the first resistor and the primary gate, and the second node is located between the first resistor and the secondary gate.

In the alternative or additionally thereto, in the foregoing embodiment, the vehicle light assembly includes a second resistor coupled directly between the second node and the primary gate; and a third resistor coupled directly between the second node and the secondary gate.

In the alternative or additionally thereto, in the foregoing embodiment, the second node is coupled to ground.

In the alternative or additionally thereto, in the foregoing embodiment, the vehicle light assembly includes a fourth resistor coupled between the second node and the ground; a fifth resistor coupled between the primary source and the ground; and a sixth resistor coupled between the secondary source and the ground.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
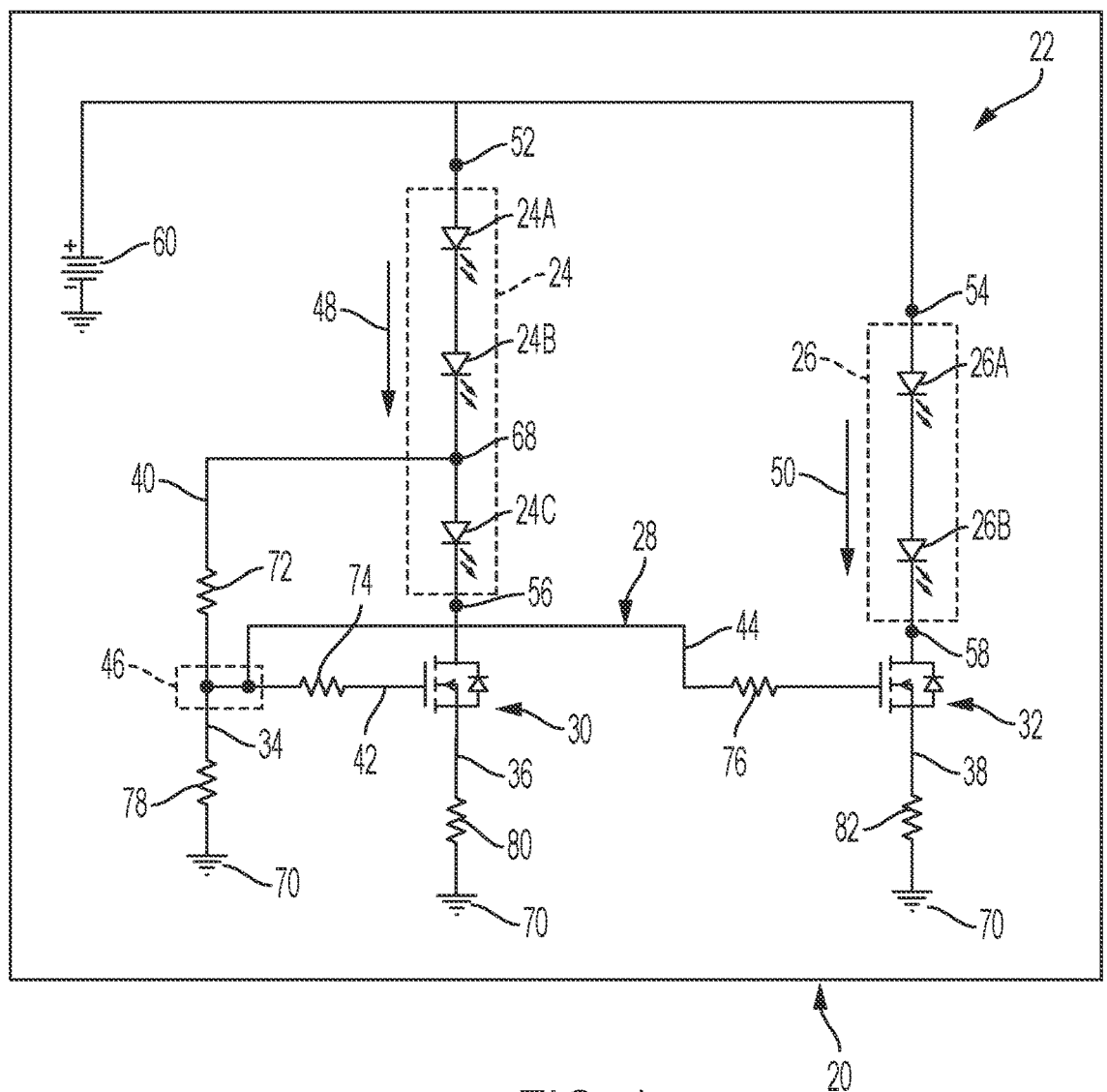
FIG. 1 is schematic of an exemplary, non-limiting, embodiment of current balancing circuit utilized in a light assembly application.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a light assembly 20 is illustrated in FIG. 1. In one embodiment, the light assembly may be adapted for use in a vehicle (not shown). Non-limiting examples of the vehicle light assembly 20 may include a rear tail assembly, a rear stop assembly, a rear turn assembly, a front turn assembly, a rear fog assembly, a low beam assembly, a high beam assembly, headlight assembly, a taillight assembly, and other applications using light emitting diodes (LEDs).

The light assembly 20 includes a current balancing circuit 22 adapted to evenly illuminate multiple strings of LEDs by balancing the electric current through each string regardless of voltage drops that vary from one LED string to the next. The current balancing circuit 22 provides a dynamic regulation by using, for example, metal oxide semiconductor field effect transistors (MOSFETs) "Drain to Source Resistance" (RDS). The current balancing circuit 22 provides a small variable RDS that allows a small voltage drop, hence producing a small power waste while controlling the current on each LED string through the MOSFETs RDS and naturally RDS is being increased by current increasing keeping constant on each string.

Referring further to FIG. 1, the current balancing circuit 22 includes a primary LED string 24, a secondary LED string 26, a reference line 28 (i.e., a common voltage reference line), a primary transistor 30, a secondary transistor 32, first ground lead 34, second ground lead 36, and third ground lead 38. The reference line 28 includes a first leg 40, a second leg 42, a third leg 44 and a node 46 for coupling of the three legs 40, 42, 44. In one, non-limiting, example, the transistors 30, 32 are MOSFETs facilitated by the positive resistance behavior.

In one example, and as illustrated, the primary LED string 24 includes three LEDs 24A, 24B, 24C, and the secondary LED string 26 includes two LEDs 26A, 26B. In other examples, the strings 24, 26 may include more or less LEDs, however, a voltage drop (see arrow 48) across the primary LED string 24 is greater than a voltage drop (see arrow 50) across the secondary LED string 26. This difference in voltage drops may be due to the summation of voltage drops across each LED of a particular string, or may be due to a greater number of LEDs on the primary LED string 24 as compared to the secondary LED string 26. Even though the voltage drops 48, 50 are different, the current through each string 24, 26 is substantially equal.

The LED string 24, 26 are orientated parallel to one-another, and each include respective input terminals 52, 54 and respective output terminals 56, 58. It is understood that the use of the term "terminals" may include an actual electrical connection terminal, or may represent a mere node where the respective strings may be hardwired into the adjacent circuit components.

The current balancing circuit 22 includes, or may otherwise be coupled to, a constant current power source 60 that may be direct current. In another embodiment, the power source 60 may be a constant voltage power source. The power source is coupled to the LED strings 24, 26 at the respective input terminals 52, 54. With regard to the primary LED string 24, LED 24A coupled and located directly to input terminal 52, LED 24C is coupled and located directly to output terminal 56, and LED 24B is located between and coupled to the LEDs 24A, 24C. With regard to the secondary LED string 26, LED 26A is coupled to and located directly adjacent to the input terminal 54, and LED 26B is located between and coupled to the LED 26A and the output terminal 58.

Figure 2:
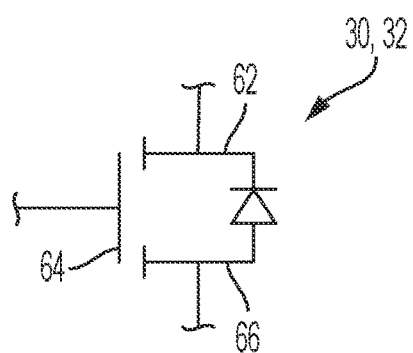
FIG. 2 is a schematic of a transistor of the current balancing circuit.

Referring to FIGS. 1 and 2, each transistor 30, 32 includes a drain 62 (or collector), a gate 64 (or base), and a source 66 (or emitter). When the current balancing circuit 22 is fully assembled, the first leg 40 of the reference line 28 extends between, and is coupled to, a node 68 and the node 46. The node 68 is located between the LED 24B and the LED 24C. The second leg 42 of the reference line 28 extends between, and is coupled to, the node 46 and the gate 64 of the primary transistor 30. The third leg 44 of the reference line 28 extends between, and is coupled to, the node 46 and the gate 64 of the secondary transistor 32.

In one example, intercepting, or otherwise coupled to, the legs 40, 42, 44 are respective resistors 72, 74, 76. More specifically, resistor 72 is located between, and coupled to, the nodes 46, 68. Resistor 74 is located between, and coupled to, the node 46 and the gate 64 of the primary transistor 30. Resistor 76 is located between, and coupled to, the node 46 and the gate 64 of the secondary transistor 32. In general, the circuit including the resistors 72, 78 acting as a voltage divider and gate resistors 74, 76. The MOSFET gates are biased by using the voltage divider.

The first ground lead 34 extends between, and is coupled to, the node 46 and ground 70. The second ground lead 36 extends between, and is coupled to, the source 66 of the primary transistor 30 and the ground 70. The third ground lead 38 extends between, and is coupled to, the source 66 of the secondary transistor 32 and the ground 70. In one example, intercepting, or otherwise coupled to, the leads 34, 36, 38 are respective resistors 78, 80, 82 (i.e., ballasting resistors). More specifically, resistor 78 is located between, and is coupled to, the node 46 and the ground 70. Resistor 80 is located between, and is coupled to, the source 66 of the primary transistor 30 and the ground 70. Resistor 82 is located between, and is coupled to, the source 66 of the secondary transistor 32 and the ground 70.

In operation, the reference is taken from the primary LED string 24. As an initial state, both MOSFETs 30, 32 have high impedance until the current flows to the reference and the primary LED string 24 enables the reference to go to all of the balanced MOSFETs.

Figure 3:
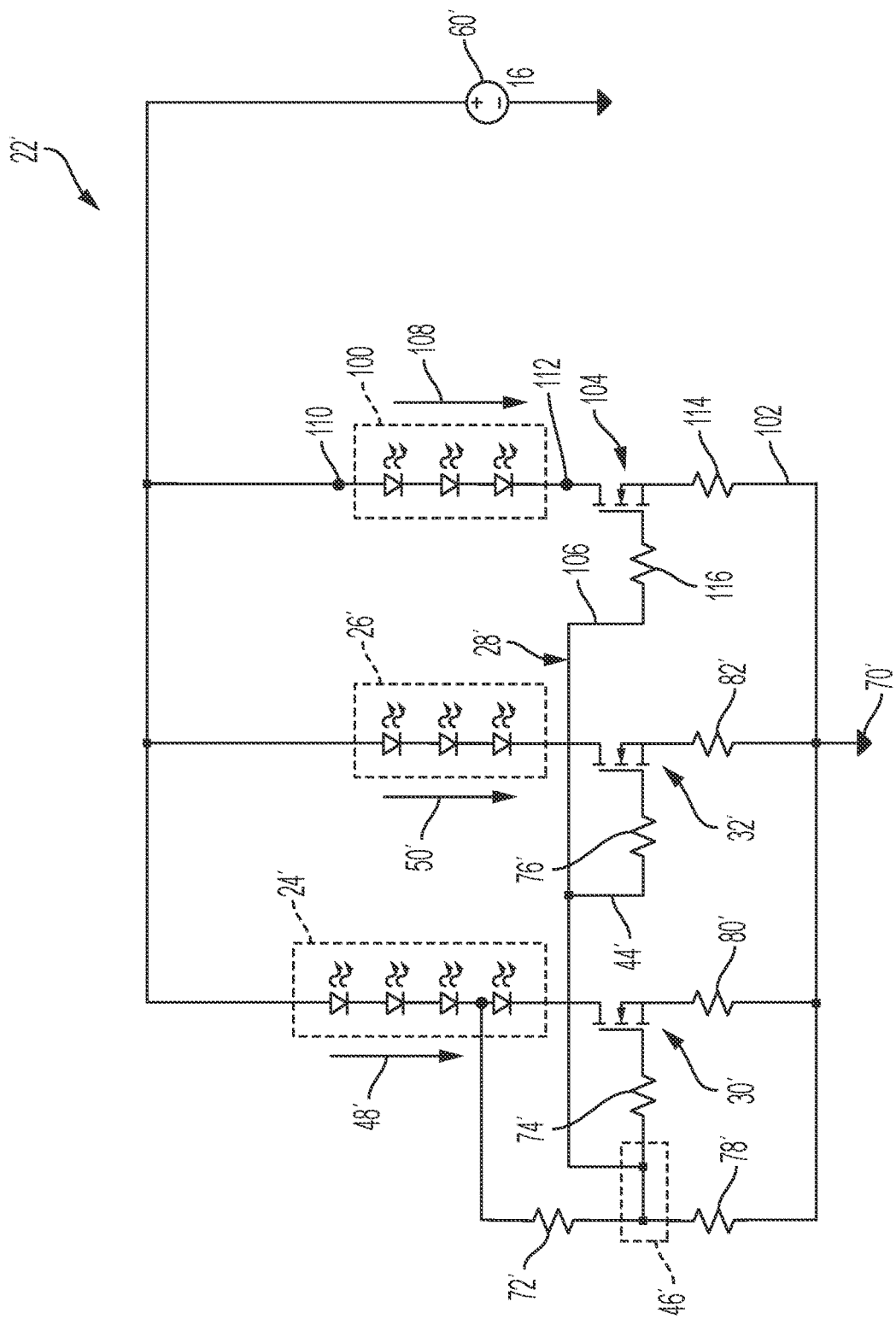
FIG. 3 is a schematic of a second embodiment of the current balancing circuit.

Referring to FIG. 3, a second embodiment of a current balancing circuit is illustrated wherein like elements to the first embodiment have like identifying numerals except with the addition of a prime suffix. In this embodiment, a current balancing circuit 22' includes a second secondary LED string 100, a fourth ground lead 102, a second secondary transistor 104, and a fourth leg 106 of a reference line 28'. The second secondary LED string 100 includes a voltage drop (see arrow 108) that is less than a voltage drop 48' across a primary LED string 24'. A current through the second secondary LED string 100 is equal to the individual currents through the primary LED string 24' and a secondary LED string 26'.

The power source 60' is connected to the LED string 100 at an input terminal 110. A drain (or collector) of the transistor 104 is coupled to an output terminal 112 of the LED string 100. The ground lead 102 extends between, and is coupled to, the source of the transistor 104 and the ground 70'. The fourth leg 106 of the reference line 28' extends between, and is coupled to, a gate of the transistor 104 and the node 46'. Similar to the first embodiment, the ground lead 102 includes a resistor 114, and the fourth leg 106 includes a resistor 116. It is further contemplated and understood, that other embodiments of a current balancing circuit may include additional secondary LED strings connected in a similar manner as described above.

In this and other embodiments, power losses of the current balancing circuit may be minimized by adjusting the MOSFET RDS ohmic linear resistance. This can be accomplished by changing the gate voltage of the MOSFET. To practically accomplish this, a high impedance voltage divider (see resistors 72, 78) adjusts gate voltage and uses the positive feedback of any LED in a string.

Advantages and benefits of the present disclosure include maintaining an even illumination between LED strings having differing voltage drops and/or differing number of LEDs per string. Another advantage is achieving current balancing between LED strings with minimum heat power losses in the electronics boards by adjusting the MOSFET RDS ohmic linear resistance.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A current balancing circuit comprising:
   a primary light emitting diode (LED) string having a primary voltage drop, a first node disposed between two adjacent LEDs of the primary LED string, an input terminal, and an output terminal;
   a secondary LED string configured in parallel with the primary LED string, the secondary LED string having a secondary voltage drop being less than the primary voltage drop, an input terminal, and an output terminal;
   a reference line coupled to the first node;
   a primary transistor including a primary drain, a primary gate, and a primary source, the primary drain being coupled to the output terminal of the primary LED string, the primary gate being coupled to the reference line, and the primary source being coupled to a ground; and
   a secondary transistor including a secondary drain, a secondary gate, and a secondary source, the secondary drain being coupled to the output terminal of the secondary LED string, the secondary gate being coupled to the reference line, and the secondary source being coupled to the ground.

2. The current balancing circuit set forth in claim 1, wherein the primary and secondary transistors are metal oxide semiconductor field effect transistors (MOSFETs).

3. The current balancing circuit set forth in claim 1, further comprising:
   a first resistor located in the reference line and between a second node of the reference line and the first node, wherein the second node is located between the first resistor and the primary gate, and the second node is located between the first resistor and the secondary gate.

4. The current balancing circuit set forth in claim 3, further comprising:
   a second resistor coupled directly between the second node and the primary gate; and
   a third resistor coupled directly between the second node and the secondary gate.

5. The current balancing circuit set forth in claim 4, wherein the second node is coupled to ground.

6. The current balancing circuit set forth in claim 5, further comprising:
   a fourth resistor coupled between the second node and the ground;
   a fifth resistor coupled between the primary source and the ground; and
   a sixth resistor coupled between the secondary source and the ground.

7. The current balancing circuit set forth in claim 6, wherein the fourth, fifth, and sixth resistors are ballasting resistors.

8. The current balancing circuit set forth in claim 7, wherein the primary and secondary transistors are metal oxide semiconductor field effect transistors (MOSFETs).

9. The current balancing circuit set forth in claim 1, wherein the primary LED string includes more LEDs than the secondary LED string.

10. The current balancing circuit set forth in claim 1, further comprising:
    a constant current power source coupled to the input terminals of the primary and secondary LED strings.

11. The current balancing circuit set forth in claim 1, further comprising:

a constant voltage power source coupled to the input terminals of the primary and secondary LED strings.

12. The current balancing circuit set forth in claim 3, further comprising:
   a second secondary LED string configured in parallel with the primary and secondary LED strings, the second secondary LED string having a second secondary voltage drop that is less than the primary and secondary voltage drops; and
   a second secondary transistor including a second secondary drain, a second secondary gate, and a second secondary source, the second secondary drain being coupled to an output terminal of the second secondary LED string, the second secondary gate being coupled to the reference line, and the second secondary source being coupled to the ground.

13. The current balancing circuit set forth in claim 12, wherein the second node is located between the first resistor and the second secondary gate.

14. The current balancing circuit set forth in claim 2, wherein the MOSFETs are configured for MOSFET RDS ohmic linear resistance.

15. A vehicle light assembly comprising:
   a primary light emitting diode (LED) string having a primary voltage drop, a first node disposed between two adjacent LEDs of the primary LED string, an input terminal, and an output terminal;
   a secondary LED string configured in parallel with the primary LED string, the secondary LED string having a secondary voltage drop being less than the primary voltage drop, an input terminal, and an output terminal;
   a reference line coupled to the first node;
   a primary transistor including a primary drain, a primary base, and a primary source, the primary drain being coupled to the output terminal of the primary LED string, the primary gate being coupled to the reference line, and the primary source being coupled to a ground; and
   a secondary transistor including a secondary drain, a secondary gate, and a secondary source, the secondary drain being coupled to the output terminal of the secondary LED string, the secondary gate being coupled to the reference line, and the secondary source being coupled to the ground.

16. The vehicle light assembly set forth in claim 15, wherein the primary and secondary transistors are metal oxide semiconductor field effect transistors (MOSFETs).

17. The vehicle light assembly set forth in claim 15, further comprising:
   a first resistor located in the reference line and between a second node of the reference line and the first node, wherein the second node is located between the first resistor and the primary gate, and the second node is located between the first resistor and the secondary gate.

18. The vehicle light assembly set forth in claim 17, further comprising:
   a second resistor coupled directly between the second node and the primary gate; and
   a third resistor coupled directly between the second node and the secondary gate.

19. The vehicle light assembly set forth in claim 18, wherein the second node is coupled to ground.

20. The vehicle light assembly set forth in claim 19, further comprising:
   a fourth resistor coupled between the second node and the ground;
   a fifth resistor coupled between the primary source and the ground; and
   a sixth resistor coupled between the secondary source and the ground.

* * * * *